United States Patent [19]

McAlarney

[11] 3,998,318
[45] Dec. 21, 1976

[54] EXTRUDER SCREW
[75] Inventor: Fred R. McAlarney, Seymour, Ind.
[73] Assignee: The Pantasote Company, Greenwich, Conn.
[22] Filed: Mar. 31, 1975
[21] Appl. No.: 563,358
[52] U.S. Cl. .............................. 198/657; 29/183; 29/193; 148/131; 425/208
[51] Int. Cl.[2] ..................................... B65G 33/08
[58] Field of Search ............... 198/213, DIG. 7; 425/208; 148/31; 29/183, 193; 75/123 R, 126 R; 259/191

[56] References Cited
UNITED STATES PATENTS 2,828,202  3/1958  Goetzel et al. .................. 148/31 X
3,271,083  9/1966  Hobbs et al. .................. 198/213 X
3,696,913  10/1972  Anders ............................ 198/213

FOREIGN PATENTS OR APPLICATIONS 883,421  7/1953  Germany ........................... 198/213

Primary Examiner—Evon C. Blunk
Assistant Examiner—Douglas D. Watts

[57] ABSTRACT

An extruder screw has a portion of the flight thereof composed of a titanium carbide/steel composite of a hardness $R_c$ 55–68 to extend the life of the screw when used to extrude filled plastics material.

13 Claims, 3 Drawing Figures

EXTRUDER SCREW

The present invention relates to improvements in extruder screws, and more particularly to extruder screws used in extruding plastics materials containing abrasive particles.

Extruded shapes of filled plastics materials are readily made, but the severe abrasion caused by the filler results in excessive wear of the extruder screw and barrel. This problem is encountered with a variety of filled plastics, such as those containing fiberglass, titanium dioxide, granite, glass, barium ferrite and other magnetic particles, and the like.

It is an object of this invention to provide an extruder screw with improved abrasion resistance.

It is another object of the invention to provide an extruder screw particularly suitable for extrusion of magnetic plastics.

These objects are accomplished by the present invention, which provides an extruder screw having a cylindrical root and a flight helically disposed along said root, said flight being operable to convey plastics material from one end of the screw to the opposite end thereof, at least a portion of the flight adjacent said opposite end being composed of a composite of titanium carbide particles uniformly distributed in a steel matrix and having a Rockwell C hardness of 55 to 68.

An extruder screw normally has three sections: a feed section at one end of the screw and adjacent the feed opening of the extruder; a transition section adjacent the feed section; and a metering section at the other end of the screw. As is well know, as material is conveyed through the feed section, it is heated by conduction and shear until quite soft. Flight depth is relatively deep and nearly constant in the feed section. As material enters the transition section, it is compressed and transformed into continuous melt. Air is excluded and pushed back toward the feed opening. Flight depth progressively diminishes. The metering section generally has a constant cross-section, but usually with relatively shallower flight depth. The shallow flight depth provides sufficient back pressure to make the melt homogenous through shearing to provide uniform composition and temperature. The constant flight depth tends to damp out any variations in flow rate produced in earlier sections; thus this section acts as a constant-volume metering pump.

Specialized screws may use two or more helical flights, and may have reverse flights. However, the screws will generally comprise the three main sections described above.

It has now been found that if the flight or flights, and preferably the root and flight, in at least the metering section is composed of a composite of titanium carbide particles uniformly distributed in a steel matrix and having a Rockwell C hardness of 55 to 68, the life of the screw is extended from about one week to as much as six months. Surprisingly, the life of the barrel is also extended, as much as four times, even though the barrel is made of conventional material.

The present invention may take several forms. For example, the root and flight may be made entirely of the titanium carbide/steel composite, or the extruder screw can be made of conventional material in all but the metering section, with the metering section being made of the titanium carbide/steel composite and being keyed or otherwise joined to the remainder of the screw. In all cases, the flight, and preferably the root and flight, in at least the metering section will be made of the titanium carbide/steel composite to obtain best results.

In a preferred embodiment of the invention, the screw comprises a steel mandrel having a longitudinally extending keyway, and several flight sections are keyed into the keyway, each flight section comprising a hollow cylinder carrying on its outer surface a segment of a flight helically extending around the hollow cylinder, the flight segments forming a continuous flight when the flight sections are assembled on the mandrel.

The titanium carbide/steel composite is commercially available under the registered trade mark "Ferro-Tic" from the Sintercast division of Chromalloy American Corporation, West Nyack, New York. U.S. Pat. Nos. 2,828,202; 3,145,100; 3,279,049; 3,416,976; and 3,653,982 describe such composites. The most suitable grade is "Ferro-Tic" CM, a titanium carbide/steel composite which contains 45 vol. % of titanium carbide embedded in a chromium tool steel matrix making up the balance. "Ferro-Tic" grade C is also suitable. To make the screw, screw section, or flight segments, the titanium carbide/steel composite, which is furnished in the form of bar stock of a hardness $R_c$ 42–46, is readily machined into any desired shape using conventional tooling. After fabrication, it is hardened to $R_c$ 55–68, preferably 60–68, by gas quenching in vacuum or indirect oil quenching from 2000°F and tempering twice, first at 975° and then at 950° F. The material moves very little during heat treatment because of the large amount of stable carbides in its structure. It undergoes a lineal size change of about ±0.00025 inch per inch depending upon the method of heat treatment used and the severity of cooling from the austentizing temperature to room temperature.

I have found the hardness of the finished product to be an essential feature of the invention. When the composite reaches a hardness $R_c$ of about 72, the torque developed by the extruder screw will severely damage the screw, even breaking it in two. At hardnesses below about $R_c$ 55, the cost of the screw is too high to justify the slight additional increase in useful life. At a hardness, $R_c$, of about 55 to about 68, preferably about 60 to about 68, such as $R_c$ 65–66, the life of the screw sharply increases and more than offsets the additional cost of the screw.

The present invention is illustrated by the accompanying drawing, in which

Figure 1:
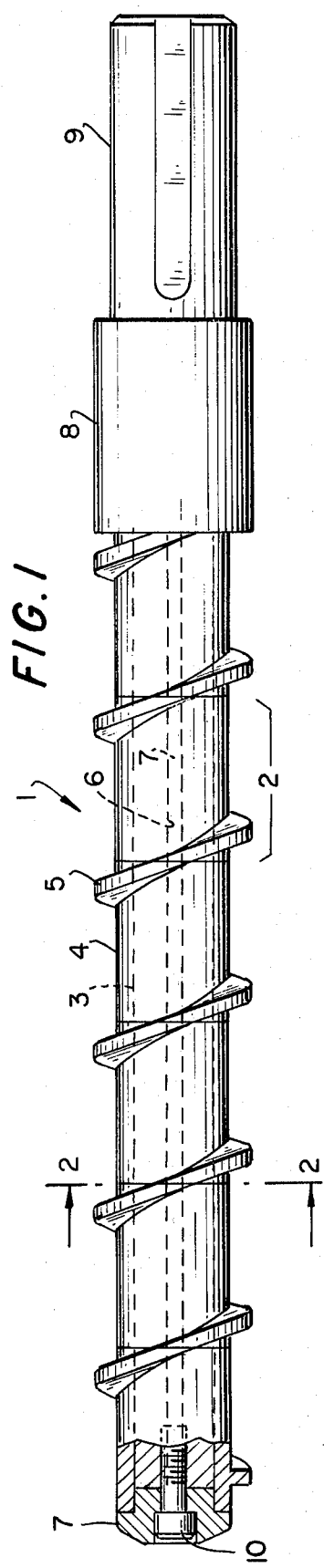
FIG. 1 is a plan view of an extruder screw of the invention, with a portion thereof broken away and in section.

With reference to the drawings, an extruder screw 1 has a plurality of hollow, cylindrical flight sections 2 carried by a steel mandrel 3. Each flight section 2 has a root segment 4 and a flight segment 5 helically extending around the root segment 4. It has been found to be convenient to proportion the flight sections 2 so that the length of the flight section is equal to the lead, i.e. the distance between adjacent turns of the flight, but other proportions can be used, if desired. Screw design is highly empirical and depends in large measure on the plastics material being extruded, and thus customary procedure for screw design will be employed in producing the screw of the invention.

The flight sections 2 are held in place by means of the opposed keyways 6 in mandrel 3 and the opposed keys 7, which are an integral part of the root 4. Keys 7 are slightly narrower than the keyway 6 to assist in taking up the torque and flexing of the screw during use. Of course the keyways could be provided in the root 4 and the keys could be part of the mandrel 3 (not shown), but the configuration shown in FIGS. 1 and 2 is preferred since there is less chance of the short keys 7 being broken off when they are made of the hard, abrasion-resistant titanium carbide/steel composite.

Retainer cap 7 is fastened to the mandrel 3 by any suitable means, such as the bolt 10, which is screwed into the mandrel.

The screw 1 has a base 8, from which mandrel 3 extends, and a stock 9, by means of which the screw 1 is secured in the extruder. The base 8 and stock 9 are conventional.

Figure 2:
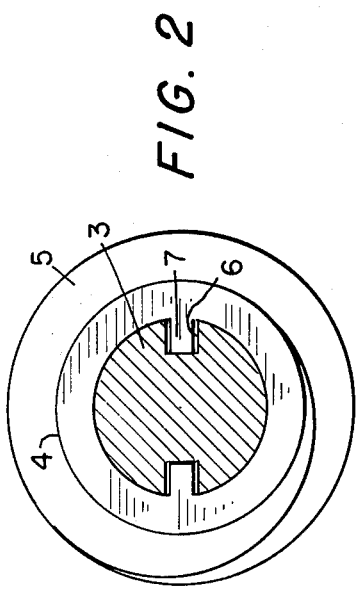
FIG. 2 is a view in section, taken along lines 2—2 in FIG. 1.

In the embodiment shown in FIGS. 1 and 2 the metering section consists of the two flight sections 2 adjacent the retainer cap 7, the feed section consists of the two flight sections 2 adjacent base 8, and the transition section consists of the two flight sections in the middle. As shown in FIG. 1, only the two flight sections 2 in the metering section are made of the titanium carbide/steel composite, with a hardness $R_c$ 65–66, and the other flight sections are made of steel as is customary. It has been found that the metering section is subject to the most abuse and hence requires the most protection. However, any or all of the other flight sections 2 can be made of the titanium carbide/steel composite if additional abrasion resistance is required in these sections. By the use of several flight sections 2, it is a simple matter to remove a damaged or badly worn flight section and replace it with a new section, thus obviating the need for complete replacement of the entire screw.

Flight sections 2 are made from tool steel in the customary manner, as by machining. Those flight sections 2 that are made from the titanium carbide/steel composite are machined and quenched to the hardness $R_c$ 65–66 using "Ferro-Tic" CM as described above.

Figure 3:
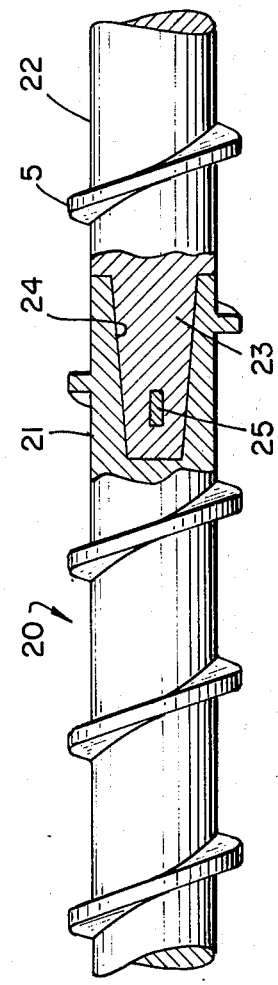
FIG. 3 is a plan view, partly in section, of an alternative embodiment of the invention.

FIG. 3 shows an alternative embodiment of the invention in which extruder screw 20 comprises two sections 21 and 22, section 21 being composed of the titanium carbide/steel composite and section 22 being made of steel that is customarily used in extruder screws. Section 21 has a recess 24 into which projection 23 of section 22 closely fits, and three equally spaced keys, one of which is seen at 25, hold the sections 21 and 22 together. Section 21 is machined from the titanium carbide composite "Ferro-Tic" CM as described above and is hardened to a hardness $R_c$ 65–66, as above.

The screw 20 of FIG. 3 is useful in smaller diameter screws, such as about 1.5 inches root diameter. For larger diameter screws, such as about 3.0 inches root diameter and larger, the screw 1 shown in FIGS. 1 and 2 will be better adapted to withstand the larger torques.

It is presently preferred to use "Ferro-Tic" grade CM, since this retains its hardness and abrasion resistance at temperatures of up to about 600° F, whereas "Ferro-Tic" grade C tends to lose its hardness at about 500° F. Of course, if the temperatures encountered by the screw are below 500° F, then this is not a problem and grade C can be used.

The present invention provides an extruder screw that is useful in the extrusion of any filled plastics material, including rubbers and synthetic rubbers, that presents a problem of excessive wear. The fillers can be any of those mentioned above, as well as metals, metal powders, metal flakes, etc., that are known to cause wear of the extruder screw.

The present invention finds its greatest utility as an extruder screw for plastics materials, but it has great value in other uses where abrasion of a screw is a problem. For example, a screw used to separate and space glass bottles coming off a conveyor is subject to abrasion, and its life would be extended if that part of the flight contacting the bottles were made of the titanium carbide/steel composite. Similarly, conveyor screws used in conveying metals would also be improved by being made according to the invention.

What is claimed is:

1. A screw having a root and a flight helically disposed on said root, at least a segment of the flight being composed of a composite of titanium carbide particles uniformly distributed in a steel matrix and having a Rockwell C hardness of 60 to 66.

2. An extruder screw having a root and a flight helically disposed on said root, at least a segment of the flight being composed of a composite of titanium carbide particles uniformly distributed in a chromium steel matrix and having a Rockwell C hardness of 60 to 66.

3. The extruder screw according to claim 2, wherein said flight segment comprises the meeting section of the screw.

4. The extruder screw according to claim 2, wherein said flight segment is carried by a root segment that is also composed of said titanium carbide/steel composite.

5. The extruder screw according to claim 2, wherein a first portion of the screw providing at least part of the metering section is composed of said titanium carbide/steel composite and a second portion of the screw providing the remainder of the screw is composed of steel, said portions being secured together.

6. The extruder screw according to claim 2, wherein the entire screw is composed of said composite.

7. The extruder screw according to claim 2, wherein the entire root and flight are composed of said titanium carbide/steel composite.

8. The extruder screw according to claim 2, wherein said screw includes a mandrel, a plurality of hollow cylindrical flight sections on said mandrel, each flight section having a segment of a flight helically extending around the hollow cylinder, the flight sections forming said root and flight when assembled on said mandrel, at least one flight section being composed of said titanium carbide/steel composite, and means for securing said flight sections to the mandrel.

9. A section of an extruder screw, comprising a root, and a segment of a flight helically extending around said root, said root and flight segment being composed of a composite of titanium carbide particles uniformly distributed in a chromium steel matrix and having a Rockwell C hardness of 60 to 66.

10. The screw section according to claim 9, wherein the root is hollow.

11. The screw section according to claim 9, wherein the hardness is $R_c$ 65 to 66.

12. The screw section according to claim 9, wherein the matrix is a chromium steel matrix.

13. The extruder screw according to claim 2, wherein the hardness is $R_c$ 65 to 66.

* * * * *